Aug. 27, 1968   W. G. BALLENGER ET AL   3,398,839

SNAP-ON HANGER

Filed Oct. 13, 1966   3 Sheets-Sheet 1

Inventors
William G. Ballenger
Robert G. Schaefer
Dominik, Stein & Knechtel
Atty's Aug. 27, 1968    W. G. BALLENGER ET AL    3,398,839
SNAP-ON HANGER
Filed Oct. 13, 1966    3 Sheets-Sheet 2
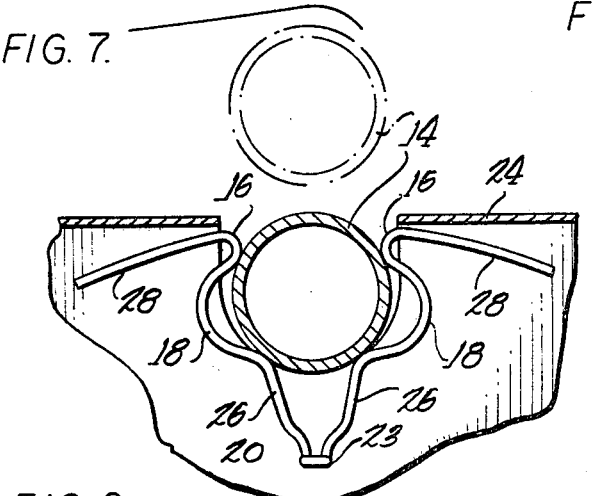
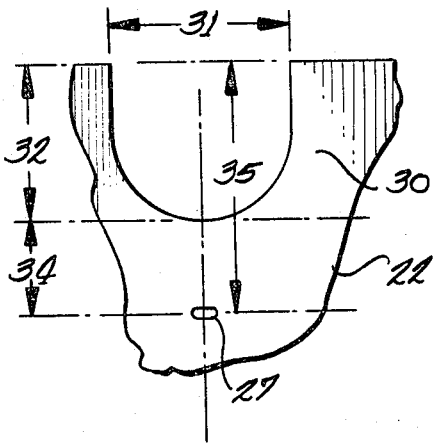
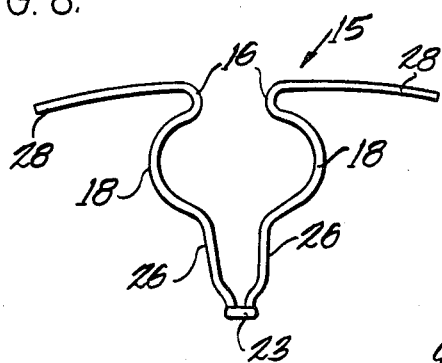
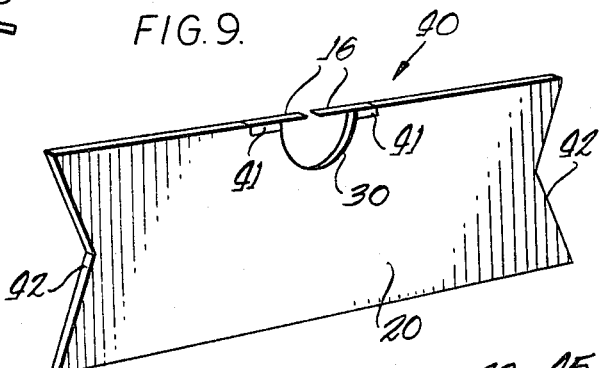
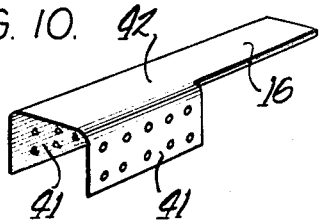
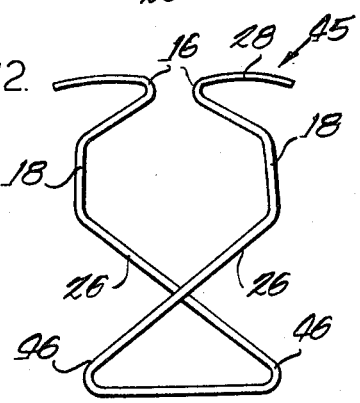
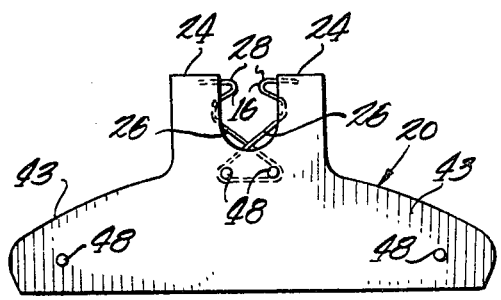
Inventors
William G. Ballenger
Robert G. Schaefer
Dominik, Stein & Knechtel
Atty's Aug. 27, 1968  W. G. BALLENGER ET AL  3,398,839
SNAP-ON HANGER
Filed Oct. 13, 1966  3 Sheets-Sheet 3
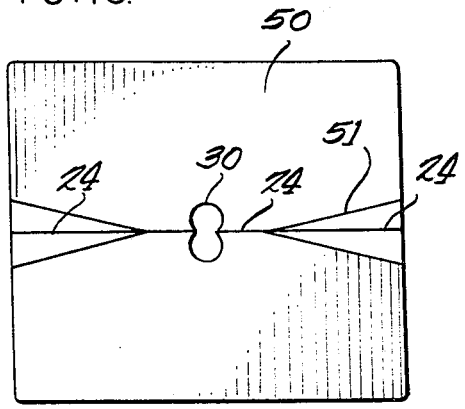
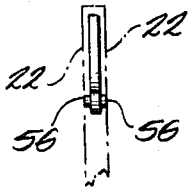
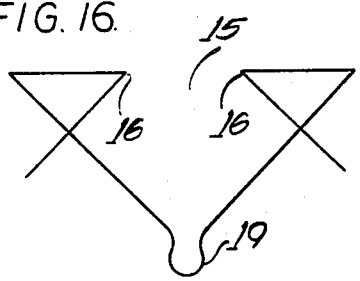
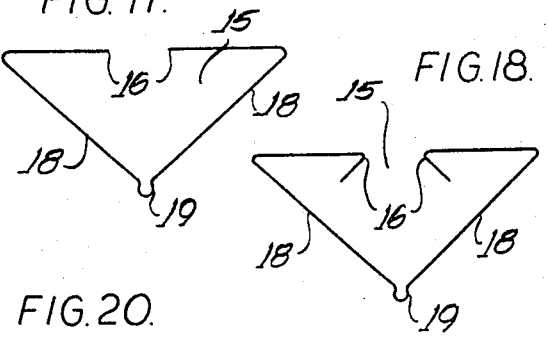
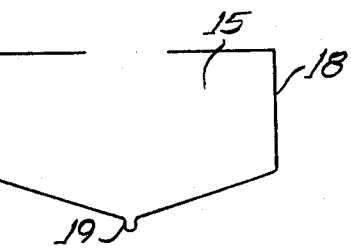
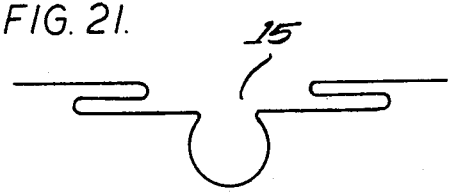
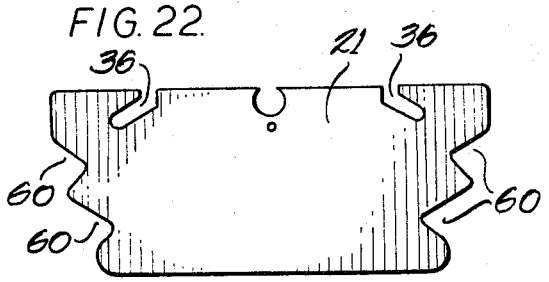
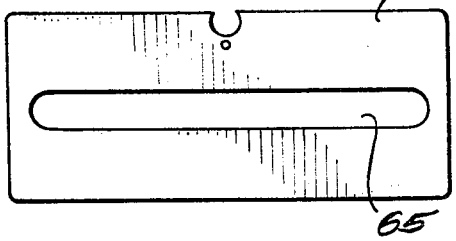
Inventors
William G. Ballenger
Robert G. Schaefer
Dominik, Stein & Krechtel
Atty's

United States Patent Office 3,398,839
Patented Aug. 27, 1968

3,398,839
SNAP-ON HANGER
William G. Ballenger and Robert G. Schaefer, Highland
Park, Ill., assignors to Central Specialties Co., Chicago,
Ill., a corporation of Illinois
Filed Oct. 13, 1966, Ser. No. 586,522
8 Claims. (Cl. 211—13)

ABSTRACT OF THE DISCLOSURE

A hanger including a body member having a pair of opposed nibs which are oriented with an arcuate open portion thereof in a fashion such that the nibs and the body member cooperate to define a yieldable closure approximating the size of a closet or storage bar. A garment or other device to be displayed or stored is secured on the body member, and the hanger can be snapped in place on a conventional closet bar.

---

The present invention relates to a hanger construction, and more particularly a hanger construction for securing garments and the like to a bar display rod or closet rod in a removably secured fashion, and without the use of a hook or other permanent rod overlapping member.

The standard bent wire coat hanger has become a household institution, without substantial improvement for years. As the wire becomes bent, the curved hook portion overlapping the storage rod permits adjacent hangers to be fouled with each other, and removal without difficulty virtually impossible when the clothing stored on the rack is compressed closely together. In stores where clothing is displayed on bar racks, this problem becomes increasingly more difficulty where various clerks or customers remove the stored material from the racks, carelessly scatter the same around the store, and the same is subsequently replaced. As the hooks become bent or fouled, fewer garments can be displayed on the same rack, and more clerical time is required in handling the garments. Furthermore, with the increasing employment of wash and wear materials, a wide variety of varying synthetic fabrics, and requirements in certain states regarding washing instructions, it becomes increasingly more difficult to placard the clothing with such instructions. Large chain stores are insisting that the instructions for washing be placed on the garment, and further insisting that the manufacturer supply the garments ready for hanging.

In view of the foregoing the present invention has as a primary object the provision of a hanger which can be originally inserted in the garment, which is susceptible of bearing printed material relating to instructions for use and advertising by the manufacturer as well as size information, and which can be efficiently and expeditiously removably secured to bar racks in such an efficient manner that the amount of garments storable on a 6-foot bar rack can be almost doubled over conventional storage techniques. A closely related object of the present invention is to provide a hanger which will achieve the foregoing advantages and not substantially increase the manufacturer's cost.

A further object of the invention is to provide a hanger providing all of the foregoing advantages, in which it is possible to contact the garments only with paperboard, and accordingly irrespective of humidity and transportation characteristics, there is virtually no risk of the garment becoming stained from plastic migration, metal rusting, and a whole host of other difficulties which are experienced with conventional hanger constructions.

The invention stems from the discovery that by providing a body portion having a pair of opposed nibs which are oriented within an arcuate open portion of a body member, the nibs and the body member cooperating to define a yieldable closure approximating the size of a closet or storage bar, that when a garment or other device to be displayed or stored is secured on the body, the same can be snapped in place on a conventional closet bar. The yieldable bar engaging member can be inexpensively formed of wire, molded of plastic, or even fashioned of yieldable sheet stock. The body portion can be formed of paperboard, and in a preferred embodiment the wire bar engaging member made of a single piece of wire, and secured by an offset tab, or rivets and eyelets, to the paperboard body portion. Naturally, the body portion can be simply cut with a steel rule die or conventional paper forming techniques to a wide variety of configurations depending upon the garment to be stored, and additionally may be printed, embossed, plastic coated, or otherwise finished in accordance with the maufacturer's or customer's desires. The high degree of flexibility of usage of the hanger renders its construction desirable to the customer even after purchasing the garment which has been so stored by the manufacturer. The retailer who may store the garments finds the same highly desirable because of the flat silhouette, and the fact that the means for attaching to a bar are retractable within the body portion and accordingly cannot foul with an adjacent unit. In this manner, the effort required to put the manufacturer's garments on a bar rack, and remove the same, are substantially reduced. Furthermore, because the hanger is no thicker than a pair of paperboard pieces and a thin wire, substantially more garments can be oriented and stored on a bar rack.

Further objects and advantages of the present invention will become apparent as the following description of a preferred embodiment, and alternative illustrative embodiments proceeds in which:

FIG. 6 is a front elevation of the cut-out portion of the body portion illustrating the preferred dimensions for use with standard closet hanging bars.

FIG. 7 is an alternative view of the action shown in FIG. 3 illustrating how the hanger accommodates various bar sizes.

FIG. 8 is a plan view of a preferred wire form as shown in FIG. 3.

FIG. 9 is a front elevation of an alternative construction for a hanger in which spring steel is employed for engaging the bar.

FIG. 10 is a perspective view of one of the spring steel pieces employed in the alternative hanger construction of FIG. 9.

FIG. 11 is a front elevation of a further alternative embodiment illustrating a hanger construction in which the wire is secured to the paperboard body portion by eyelets.

FIG. 12 is a plan view of the wire bar engaging member employed in the hanger construction of FIG. 11.

FIG. 13 is a layout plan view of a body portion illustrating how the hanger body may be formed to have sloped shoulders.

FIG. 14 diagrammatically illustrates how a plastic molded clip bar engaging member portion may be employed with the present invention.

FIG. 15 is an end view of the structure shown in FIG. 14 using a plastic clip.

FIG. 16 is a plan view of an alternative embodiment wire formed bar engaging member.

FIG. 17 discloses a further alternative embodiment of a bar engaging wire formed member.

FIG. 18 discloses still a further alternative embodiment of a wire formed bar engaging member.

FIG. 19 discloses still a further embodiment of a bent wire formed bar engaging member.

FIG. 20 is another plan view of an alternative embodiment bent wire formed bar engaging member.

FIG. 21 is another embodiment of a bent wire bar engaging member comparable to that shown in FIGS. 11 and 12 but without the dog-eared end portions.

FIG. 22 discloses an alternative form of paperboard body portion cut out to receive trousers or slacks.

FIG. 23 is still another illustrative modification of the body portion disclosing how the same may be cut out to display slips by the shoulder straps, or half slips by a waistband attachment to recessed locking portions in the lateral edges thereof.

Figure 1:
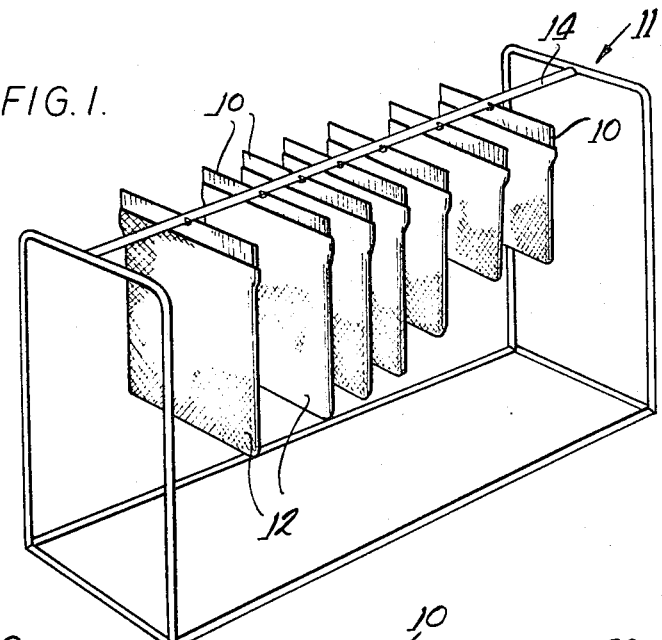
FIG. 1 is a perspective view illustrating diagrammatically how a plurality of children's garments can be placed on a bar rack with the subject hanger.
Figure 2:
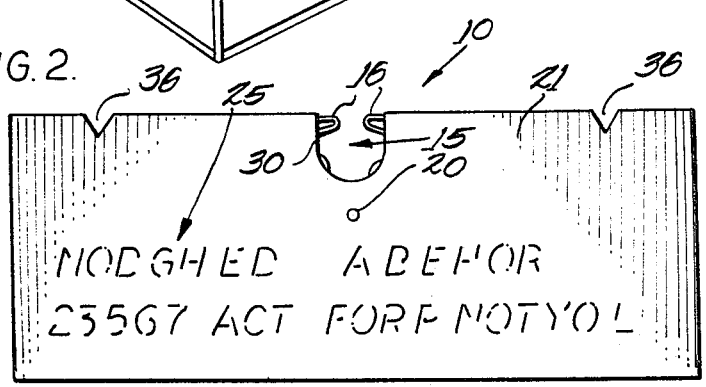
FIG. 2 is a front elevation of a typical hanger illustrative of the present invention.

Referring now to the drawings, a typical illustration of the use of the subject hanger is shown in FIG. 1 where the hanger 10 and its garment which it supports is secured to a longitudinal bar 14 on a display rack 11. As shown in FIG. 2, a bar engaging member 15 is nested within a body portion 21 with a pair of nibs 16 extending across an arcuate body cutout portion 30. As will be set forth in greater detail hereafter, the bar engaging member 15 is secured within the body 21 by means of a rivet 20, or offset tab 23.

Figure 4:
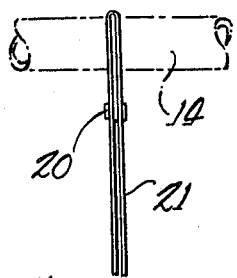
FIG. 4 is an end view of the hanger of FIG. 2.

While the illustrative garments 12 shown in FIG. 1 are secured by an elastic upper portion engaging with the lateral edges of the body 21, it will also be observed that notches 36 may be provided in the upper edge of the body 21 in order to support shoulder straps for garments such as bathing suits, slips, and the like. In operation, once the garment is secured to the hanger 10, whether by means of the lateral edges or the shoulder strap notches, the hanger 10 is pressed upwardly against the hanging bar 14, and the nibs 16 retract to thereafter receive the bar 14 within the body cutout 30. Thereafter, because of the yieldable action of the bar engaging member 15, the nibs close over the opening 30 and engage the bar 14 in the manner as shown diagrammatically in FIG. 3. The net result is that the hanger 10 and its associated garment 12 is removably secured to the bar 14, but requiring a firm downward movement, greater than the weight of the hanger and the garment, to dislodge the same. As will be seen in FIG. 4 (an end view of the hanger shown in FIG. 2), the hanger body 21 presents a very narrow silhouette, and ideal transverse alignment along the bar 14. This orientation and positioning contrasts with larger and more bulky plastic hangers and their bulky skirt clamps, or hangers in which removable members are secured to the bottom, and even conventional household hangers after the same become twisted and bent as a result of wear. The retractable nature of the position and orientation of the nibs 16 further inhibits the type of distortion common with conventional hangers, and the body members 21 are actually constrained against each other when, for example, the seven items shown in FIG. 1 are all compressed at one end of the bar 14.

Figure 3:
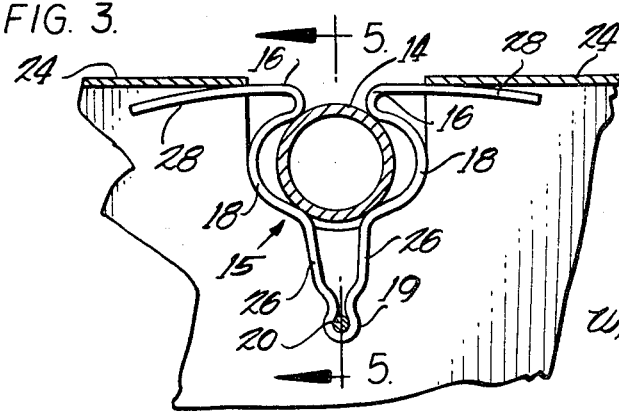
FIG. 3 is an enlarged partially diagrammatic transverse view of the bar engaging portion of the hanger illustrated in FIG. 2, disclosing how it yieldably engages the bar.
Figure 5:
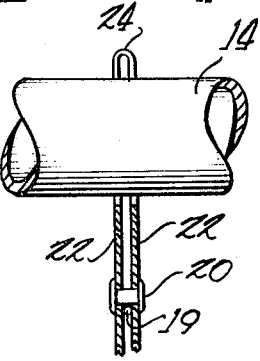
FIG. 5 is an end view in corresponding scale to that shown in FIG. 3 of the structure illustrated diagrammatically in FIG. 3, taken along section 5—5 thereof.

Referring now to FIG. 3, it will be seen that the embodiment of the bar engaging member 15 shown therein has a pair of opposed arcuated jaws 18 extending downwardly in opposed relationship from the nibs 16. A pair of opposed anchor portions 26 join together at the lower end in a partially closed mounting loop 19. The mounting loop 19, in turn, is secured to the body halves (see FIG. 5) by means of a rivet 20. The orientation of the rivet 20 is such that the laterally extending orienting arms 28 which extend above and outwardly from the nibs 16, engage the top crease 24 of the two body halves 22 which define the body 21. A further advantage of utilizing a body 21 made of paperboard is illustrated in FIG. 2 whereing printed indicia 25 may be spread across the face of the body 21. Printed indicia not only serves to advertise the product, but with the increasing emphasis on product labeling, union requirements for making, and washing instruction requirements as well as sizing of the product displayed, all can be placed upon the body 21.

Referring now to FIG. 7, it will be seen that the utilization of a larger proportioned bar 14 has been illustrated, and shows how the arcuate jaws 18 can expand even further from the configuration shown in FIG. 3, and still the nibs 16 be positioned to yieldably engage the bar 14. Further, it will be seen how the crease 24 (by comparing FIGS. 3 and 7) serves to guide the opening of the arcuate jaws 18 and the correlative gripping action of the nibs 16 to the end that the orienting arms 28 serve their proper guiding function.

An alternative form of securing the bar engaging member 15 is disclosed in FIGS. 6, 7 and 8, where it will be seen that instead of the mounting loop 19, an offset tab 23 is formed at the base of the anchor portion 26. The offset tab, in turn, cooperates with a locking slot positioned in one of the body halves 22 as illustrated in FIG. 6. In this manner, the bar engaging member 15 is placed against one of the body halves 22 with the offset tab 23 in the slot 27. Thereafter the opposed body half 22 is brought into face-to-face relationship with its opposite complementary portion and the same glued. In this manner the two body halves 22 and not only secured against each other for a solid laminated construction of the hanger body 21, but the cooperation of the offset tab 23 with the locking slot 27 is sufficient to secure the bar engaging member 15 within the hanger body 21.

Further illustrating the commerical embodiment, the dimensions shown in FIG. 6 are illustrative where attachment is intended on a 1¼ inch closet pole, or bar rack. There it will be seen that the opening of the body cutout 30 has a throat dimension 31 of approximately 1⅜". The total height of the body cutout 30 illustrated by reference numeral 32 is desirably 1⅛", with the distance to the locking slot 27 or the position of the rivet 20 being approximately 2³¹⁄₃₂" from the bottom of the body cutout arcuate portion 30. The overall distance 35 from the top of the body cutout 30 (or the locus of the top crease 24) to the mounting slot 27 or the rivet 20 illustrated by reference numeral 35 is ideally 1²⁷⁄₃₂". It will be appreciated, of course, that moderate variations from these dimensions depending upon the type of bar stock employed in the bar engaging member 15, or whether other embodiments are employed using different materials, will occur. Additionally, the side of the bar 14 will also affect this construction.

While the foregoing embodiments have been indicated as preferred, it will be noted that an alternative embodiment 40 is disclosed in FIGS. 9 and 10. In this alternative embodiment the body cutout 30 is substantially the same as that shown and described in FIG. 6, except that the opposed nibs 16 are secured in flanking relationship to the body cutout 30 by means of a pair of perforated clamping jaws 41 which depend from the body portion 42 (see FIG. 10). Also illustrated in FIG. 9 are opposed V-shaped cutouts 42 in the ends of the body 20 illustrative of the wide variety of configurations which may be imparted to the body 20 to suitably engage the garment 12 for attachment to the bar 14.

Still another embodiment of the subject invention is shown in FIGS. 11 and 12, and as will be observed in FIG. 11, the body portion 20 differs having lowered flanking shoulders 43. Referring to FIG. 12, it will be seen that a pair of engaging bends 46 are provided at the far ends of the anchor portions 26 and remote from the bar engaging jaws 18. The eyelets 48, or others through the body securing means, serve the purpose of securing the bar engaging member 45 to the body 20. The top crease 24 serves to cooperate with the orienting arms 28 as in the other embodiments illustrated.

In FIG. 13 an alternative embodiment body portion 50 is disclosed in which the central crease 24 may be folded inwardly adjacent the included lateral edges 51 in order to provide a slope-shouldered configuration. Here it will be noted that the body cutout portion 30 remains substantially the same as in the other embodiments.

Still another embodiment of the subject invention is disclosed illustratively in FIGS. 14 and 15 where the bar engaging member 55 is molded entirely from one piece of plastic, presenting offset nibs 16 in the same manner as the embodiments disclosed in FIGS. 1 through 8 inclusive. Rather than secure the plastic embodiment of the bar engaging member by means of a rivet, or an offset nib, a still alternative mounting means is disclosed in the form of a pair of offset studs 56 which protrude through a pair of holes in the body halves 22. The body cutout 30 remains substantially the same as in the other embodiments, and it will be noted that the nibs 16 extend inwardly to secure a rod therebetween. Corresponding to the embodiment disclosed in FIG. 8, the arcuate jaws 18 may be seen secured by means of an anchor portion 26 in this instance not to an offset tab 23, or a mounting loop 19, but to the offset opposed mounting studs 56.

FIGS. 16 through 21 illustrate a wide variety of alternative bar engaging members 15. The reference numeral 16 has been applied to the structure serving as the nibs in each instance, and the reference numeral 18 to the jaws (here in each instance the jaws being characterized by rectilinear portions rather than arcuate portions) (except in FIG. 21), and in all of FIGS. 16 through 20 a mounting loop 19 is shown at the base. It will be appreciated that in each instance where a mounting loop 19 has been shown in FIGS. 16 through 20, an offset tab 23 of the character disclosed in FIGS. 6 through 8 inclusive with a cooperative locking slot 27 could also be employed. The alternative embodiment of the bar engaging member 15 disclosed in FIG. 21 is substantially identical to that disclosed in FIG. 12 with the omission of the notches 46 which depend from the far ends of the bar engaging member 15.

FIGS. 22 and 23 are illustrative of further embodiments and configurations of the body 21 in which, for example, offset mounting notches 60 are shown at the edges of the body member 21 in FIG. 22 for the engagement of varying sizes of garments. In addition, the slip notches 36 are shown with an offset slot differing from that disclosed in the embodiment in FIG. 2 for a more secure mounting of the garment.

The alternative embodiment of the body 21 disclosed in FIG. 23 includes a longitudinal slot 65 which can be employed for supporting trousers, draperies, towels, and a whole host of other fabrics and garments which require this type of mounting.

In review it will be seen that the invention stems from the provision of a pair of offset nibs which yieldably retract from each other, and subsequently rejoin to clamp a bar between the remaining portions of the bar engaging member 15. The bar engaging member 15, fits within a host environment of a body 21 which is generally made up of a pair of body halves 22 and an upper creased portion which cooperates with the bar engaging member 15. Alternative embodiments of securing the bar engaging member within the hanger body 21 has been shown in the form of a partially closed loop with a rivet, a single offset tab with a locking slot, and a pair of offset mounting studs as well. A wide variety of body configurations are also contemplated, the same to be customized for use not only as to silhouette and configuration, but also as to the printed indicia which may be placed thereon.

A further advantage stems from the present invention in that with garments now having a permanent press, they oftentimes are subjected to an oven treatment of 300° to 400° F. for a short period of time. A wire formed bar engaging member 15 in combination with a paperboard body portion 21 can withstand such heats, whereas only the most expensive plastic hangers can survive this high temperature range exposure. In addition, as set forth above, various of the chemicals employed in such permanently treated fabrics are at war with the plasticizer in certain plastic hangers, and this can be overcome by using the wire and paperboard combination. In the alternative, where a high priced plastic must necessarily be employed to withstand the heat as outlined, the present invention contemplates a relatively small plastic bar engaging member of the character shown in FIGS. 14 and 15 in which the expense of the quantity of plastic involved is held to a irreducible minimum.

While the invention has been described in connection with specific embodiments and applications, it is not applicants' intention to restrict themselves thereto, but to include within the invention all of the subject matter defined by the spirit as well as the letter of the annexed claims.

We claim:

1. A hanger comprising, in combination, a unitary body portion having laterally extending article supporting portions adapted to support a product and having a cut out for receiving a bar centrally disposed therein in an edge thereof, a yieldable bar engaging member affixed to said body portion characterized by a pair of opposed nibs extending centrally into said cut out, said nibs being joined by yieldable anchor means in opposed yieldable separate orientation, said anchor means defining an open portion between and below the nibs, and means securing the bar engaging member to the body portion whereby the nibs open and close to yieldably and removably receive a bar.

2. In the hanger of claim 1, said anchor means terminating in a loop, and means passing through the loop to secure the yieldable bar engaging member to the body portion.

3. In the hanger of claim 1, the cut out being in the top edge of the body portion, said body portion being folded to form a top crease terminating centrally at the cut out, the whole being proportioned and oriented to secure the bar engaging member within the folded body with the nibs extending centrally into the cut out.

4. In the hanger of claim 3, offset means on the anchor means, and a cooperating slot in the body portion to receive the offset means thereby securing the yieldable bar engaging member within the body portion.

5. In the hanger of claim 3, a one-piece molded bar engaging member, an offset means on said one-piece molded member, and means defining an aperture on at least one portion of the body portion to mate with said offset means thereby securing the yieldable bar engaging member within the body portion.

6. In the hanger of claim 3, said anchor means comprising a one-piece bent wire having overlapping crossed anchor portions terminating in engaging bends, and means passing through the body portion engaging the aforesaid bends to secure the bar engaging member in the body portion.

7. In the hanger of claim 3, said anchor means comprising a one-piece bent wire yieldable member terminating at the extension of the nibs with opposed orienting arms, said orienting arms being proportioned to flex inwardly and outwardly adjacent a cut out in the top of the body and beneath a crease defined by a folded member comprising the body portion, the crease being at the upper portion thereof.

8. In the hanger of claim 3, said anchor means comprising a one-piece bent wire yieldable member terminating at the extension of the nibs with opposed orienting arms, said orienting arms being proportioned to flex inwardly and outwardly beneath said crease defined by a folded member comprising the body portion.

References Cited

UNITED STATES PATENTS

| | | |
|---|---|---|
| 1,066,543 | 7/1913 | Stillwell. |
| 2,584,218 | 2/1952 | Walton _____ 223—87 XR |
| 2,634,730 | 4/1953 | Hoffman _____ 129—16.7 |
| 3,001,675 | 9/1961 | Aynes et al. _____ 223—88 |
| 3,275,003 | 9/1966 | Chamberlin _____ 129—16.7 |

FOREIGN PATENTS 650,516  2/1951  Great Britain.

ROY D. FRAZIER, *Primary Examiner.*

W. D. LOULAN, *Assistant Examiner.*